April 27, 1943.   I. ZIMT   2,317,872
GREASE GUN
Filed May 15, 1941
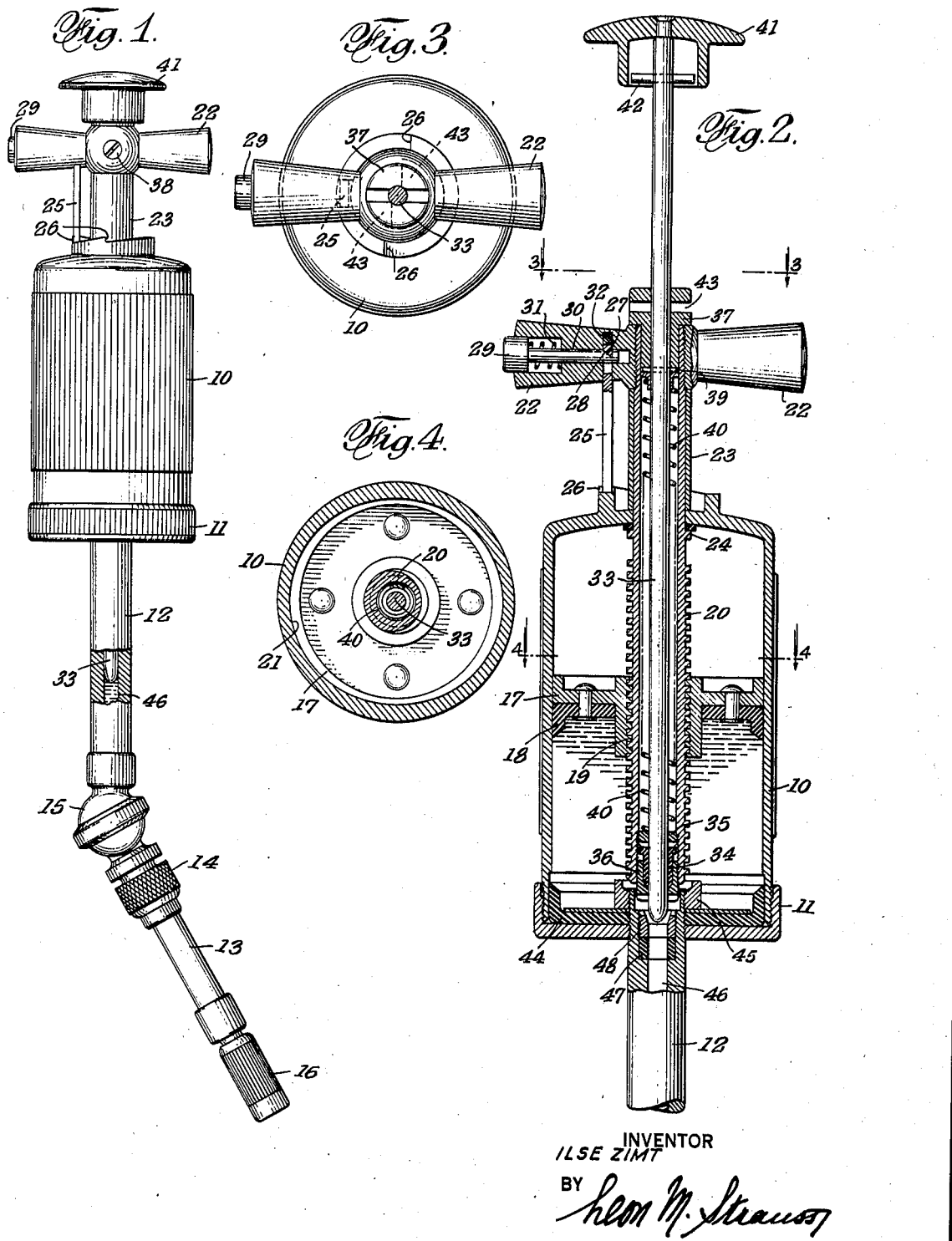
INVENTOR
ILSE ZIMT
BY Leon M. Strauss Patented Apr. 27, 1943

2,317,872

UNITED STATES PATENT OFFICE 2,317,872

GREASE GUN

Ilse Zimt, New York, N. Y.

Application May 15, 1941, Serial No. 393,605
In Great Britain January 22, 1941

5 Claims. (Cl. 221—47.4)

This invention relates to grease guns or apparatus and deals more particularly with devices of the type wherein lubricant is first displaced into a discharge portion and then forced from said latter portion into a fitting connected to a machine or similar part to be lubricated.

A general object of the invention is to provide a device of the aforesaid character for applying grease under high pressure with a minimum of effort to such machine part.

Another object of the invention resides in the provision of means for ejecting from a grease gun a specified amount of lubricant during each operation thereof.

Another object of the invention is to provide low pressure means for displacing the lubricant into the discharge portion and high pressure means for ejecting the lubricant from said discharge portion into the fitting receiving said lubricant.

Another object of the invention resides in the provision of means for obviating inadvertent movement of the low pressure means whereby assurance may be had that preferably specified quantities of lubricant are being fed.

The foregoing and other objects and features of the invention will become more clearly apparent from the following description, which is descriptive of a preferred embodiment of the invention illustrated in the accompanying drawing. However, the embodiment herein shown and described being for purposes of illustrations only, it is to be understood that such modifications may be made when desired, within the scope and spirit of the invention as claimed.

In the drawing:

Fig. 1 is a side elevational view partly broken, of a grease gun constructed in accordance with this invention.

Fig. 2 is an enlarged vertical sectional view of the upper portion of Fig. 1.

Fig. 3 is a plan sectional view as taken along line 3—3 of Fig. 2.

Fig. 4 is a similar view taken along line 4—4 of Fig. 2.

Referring now to the drawing, there is disclosed in the embodiment illustrated in Figs. 1 to 4 a grease gun which preferably comprises a cylinder or container 10 in which is stored the lubricant (see Fig. 2) to be ejected therefrom. The container 10 is preferably fitted with a closure cap 11 which carries a main discharge tube 12. As herein contemplated, discharge tube 12 may have connected thereto a connecting stem 13, said connecting stem being arranged for ready removal as at 14. To render the gun flexible in use, the discharge tube 12 and the connecting stem 13 may be joined as at 15 so that angular positions of the connecting stem may be obtained. In the usual manner, a chuck fitting or adaptor, such as shown at 16 may be attached to the connecting stem for coupling association with a fitting provided on the part to receive the lubricant passing from the cylinder 10 through the discharge tube 12 and through the connecting stem 13.

The cylinder 10 is fitted with a low pressure piston 17, the latter being provided with a sealing cup 18 having intimate contact with the inner wall of the cylinder 10. The piston 17 is preferably internally threaded as at 19 for engagement with a hollow threaded stem 20 centrally disposed of said cylinder 10.

Means are provided for holding the piston 17 against rotation. For this purpose, the internal wall of the cylinder is preferably formed oval, as shown at 21, preferably the cup of the piston being shaped similarly. It is obvious that rotation of the screw member 20 will cause vertical movement only of the piston along the wall of the cylinder.

Handle means, such as 22 connected to the threaded stem 20, may be provided for imparting rotation to said stem, endwise movement of said stem being obviated by the provision of a spacing tube 23 disposed between the handle 22 and the top of the cylinder 10 and a gasketed shoulder 24 on the stem engaged with the inner face of said cylinder top.

Means are provided to obviate inadvertent rotation of the handle 22 when the apparatus is put aside. In its present form, said means comprises a locking or detent member 25 carried by the handle 22 and having engagement against one of a plurality of abutments 26 carried by the cylinder 10. The detent member 25 is preferably provided with a cam face 27 engaged with a complementary cam face 28 on a plunger 29 arranged for transverse movement in a bore 30 of the handle 22. Return means, such as the spring 31 may be provided for the plunger 29 and a compressible rubber block 32 may be similarly provided for the locking member 25.

From the above structure it may be seen that the handle 22 may not be rotated in a direction to feed the low pressure piston 17 unless the plunger 29 is depressed to raise the locking member 25 out of engagement with the abutment 26 with which it is engaged.

The hollow of the stem 20 is provided for the reception of a high pressure piston 33 which thus extends co-axially with the stem 20 and centrally of the cylinder 10. The lower end of the piston 33 is sealed, as by means of packing 34 disposed between a locating gland 35 and a packing gland 36 carried by the stem 20. The upper portion of the high pressure piston 33 is preferably guided as by a plug 37 fixed to the handle 22 as by a screw 38 which also locks said handle to the stem 20. A pin 39 is arranged transversely of the piston 33 and serves as abutting means for the upper end of a spring 40, the lower end of which abuts against the locating gland 35.

The upper end of the piston 33 is fitted with an operating plunger handle 41 by means of which said piston 33 is reciprocated axially and is further provided with a transversely mounted pin 42 for engagement with bayonet slots 43 formed in a plug 37.

The closure cap 11 is preferably threadedly secured to the cylinder 10 and is provided with a packing cup 44 designed to seal the lubricant in the cylinder. The main discharge tube 12 is preferably fixedly carried by the cap 11 and in the present instance a nut 45 engaged with the threaded upper end of said tube 12 is provided to lock said tube 12 against displacement. The discharge tube 12 is preferably axially bored as at 46 to a diameter to permit ready movement of the high pressure piston 33 therein and sealing means, such as the packing 47 retained by a gland 48 is provided to prevent any back leakage of the lubricant being acted on by the high pressure piston 33.

In operation the device is first fitted with a chuck fitting or adaptor 16 designed for cooperation with the fitting of the machine or like part to be lubricated. This adaptor 16 is engaged with the fitting, the handle 22 is then grasped and the plunger 29 simultaneously depressed to raise the locking member 25. This frees the handle 22 so that it may be rotated. The rotation of the handle 22 imparts similar rotation to the threaded stem 20 and feed movement to the piston 17 and washer 18 whereby lubricant in the cylinder 10 between said piston and the closure cap 11 is forced into the bore 46 of the main discharge tube 12. In practice, a quarter or half turn of the handle 22 is sufficient to substantially fill the bore 46. The plunger handle 41 before handle 22 is given a turn is operated to free the pin 42 from the bayonet slot 43. The high pressure piston 33 is then propelled upwardly by the spring 40 from the position of Fig. 1 to that of Fig. 2.

The plunger handle 41 is then depressed to urge the high pressure piston 33 into the bore 46 to cause displacement of the lubricant in said bore through the connecting stem 13, chuck 16, and into the machine part fitting (not shown) receiving the lubricant.

If no further operation of the gun is required, the plunger handle 41 may be rotated to lock the pin 42 in the bayonet slot 43 and the gun may be put aside until again needed. If another shot of lubricant is to be made, the handle 22 is again operated as above described, and the plunger 33 again released and then depressed for a second shot of lubricant.

When the cylinder 10 has been emptied of lubricant, the cap 11 is removed, the handle 22 rotated in the opposite direction to raise the low pressure piston 17 with its washer 18 to the upper part of the cylinder 10, lubricant placed in the hollow of said cylinder and the cap 11 replaced on the cylinder 10. The device or gun is now in condition for use as above described.

It will thus be seen that there has been provided by this invention a grease gun of the character described in which the various objects hereinabove set forth, together with many thoroughly practical advantages, are successfully achieved.

As many possible embodiments may be made of the above invention, and as many changes might be made in the embodiment above set forth, it is to be understood that all matters hereinbefore set forth or shown in the accompanying drawing are to be interpreted as illustrative and not in a limiting sense.

Having thus described the invention what is claimed as new and desired to be secured by Letters Patent, is:

1. In a grease gun or the like, a cylinder formed with an oval shaped internal wall, oval shaped sealing means fitted in said cylinder, handle means connected to said sealing means for feeding the same in and along said cylinder, detent means connected with said handle means, means in said handle means for releasing said detent means, and abutment means positioned on the surface of said cylinder for cooperation with said detent means, to lock said handle means against inadvertent movement thereof during feeding operation.

2. In a grease gun or the like, a cylinder formed with an oval shaped internal wall, oval shaped sealing means fitted in said cylinder, means for moving said sealing means in said cylinder, said moving means including a handle projecting from said cylinder, and means for locking said handle against inadvertent movement thereof, said locking means comprising at least one abutment provided exteriorly of said cylinder and a member yieldably carried by said handle, said member being releasable for moving said sealing means and being engageable with said abutment for locking said handle.

3. In a grease gun or the like, a cylinder formed with an oval shaped internal wall, oval shaped sealing means fitted in said cylinder, means for feeding said sealing means in said cylinder and including a handle, and means for releasably locking said handle against inadvertent movement, said locking means comprising a plurality of abutments positioned exteriorly of said cylinder, a yieldably supported member on said handle and engageable with one of said abutments and means associated with said handle for withdrawing said member from engagement with one of said abutments.

4. In a grease gun, the combination of a low pressure cylinder adapted to contain a lubricant, a low pressure piston within said low pressure cylinder, means for operating said low pressure piston, a high pressure cylinder connected to said low pressure cylinder, a high pressure piston adapted to move through said low pressure cylinder into said high pressure cylinder, and respective locking means for impeding operations of said low pressure piston and of said high pressure piston.

5. A grease gun comprising a low pressure cylinder adapted to contain a lubricant, a low pressure piston adapted to move said lubricant within said low pressure cylinder, a high pressure cylinder connected to said low pressure cylinder and adapted to receive a predetermined quantity of lubricant from said low pressure cylinder, a high pressure piston adapted to move said lubricant in said high pressure cylinder, and respective means to impede movement of said low pressure piston in the direction of said high pressure cylinder and movement of said high pressure piston out of said high pressure cylinder.

ILSE ZIMT.